(12) United States Patent
Namkoong et al.

(10) Patent No.: US 9,881,045 B2
(45) Date of Patent: Jan. 30, 2018

(54) SYSTEM AND METHOD FOR PROCESSING DATA

(71) Applicant: SAMSUNG SDS CO., LTD., Seoul (KR)

(72) Inventors: YoungHwan Namkoong, Seoul (KR); DaWoon Kim, Seoul (KR); JeongHoon Hong, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 338 days.

(21) Appl. No.: 14/593,114

(22) Filed: Jan. 9, 2015

(65) Prior Publication Data
US 2015/0347493 A1    Dec. 3, 2015

(30) Foreign Application Priority Data

May 29, 2014    (KR) .................. 10-2014-0065157

(51) Int. Cl.
  *G06F 17/30*    (2006.01)
  *G06F 17/00*    (2006.01)
  *G11B 20/18*    (2006.01)

(52) U.S. Cl.
  CPC .. *G06F 17/30371* (2013.01); *G06F 17/30997* (2013.01); *G11B 20/18* (2013.01)

(58) Field of Classification Search
None
See application file for complete search history.

(56) References Cited

U.S. PATENT DOCUMENTS

| | | | |
|---|---|---|---|
| 2002/0095413 A1* | 7/2002 | Meding | G06F 17/30575 |
| 2004/0104925 A1* | 6/2004 | Burdick | G06F 17/3056 715/713 |
| 2004/0107202 A1* | 6/2004 | Burdick | G06F 11/3668 |
| 2004/0107203 A1* | 6/2004 | Burdick | G06F 17/30371 |
| 2004/0181512 A1* | 9/2004 | Burdick | G06F 17/30303 |
| 2010/0257145 A1* | 10/2010 | Felsheim | G06F 17/30563 707/692 |

* cited by examiner

*Primary Examiner* — Yicun Wu
(74) *Attorney, Agent, or Firm* — Sughrue Mion, PLLC

(57) ABSTRACT

Disclosed are a system and method for processing data. The system for processing data according to an embodiment of the present disclosure includes a determiner configured to receive one or more sets of input data and a set of metadata about a structure of each of the sets of input data and to determine whether the input data is normal data or abnormal data based on the metadata; a first storage configured to store the normal data; a second storage configured to store the abnormal data; and a data processor configured to correct the abnormal data stored in the second storage such that the abnormal data has the same structure as the normal data and store the corrected abnormal data in the first storage.

16 Claims, 12 Drawing Sheets

FIG. 3A

NORMAL DATA

| | WRITTEN TIME | CONTENTS OF FAILURE | PROCESSING STATUS | PROCESSING RESULT |
|---|---|---|---|---|
| RECORD 1 | 20131129153000 | H/W Fault | End | Analyze a cause of a frequent media error by strengthening monitoring/analyzing disk performance |
| RECORD 2 | 20131121013841 | - Error in PCI control chip of System Board | End | Secure an extra component |
| RECORD 3 | 20131122160606 | Log caused by multiple login fails | End | No countermeasures to management server |
| | 20131129172801 | When using Bluetooth-related device in global device as a Hyper-v device, a kernel message is generated. | Processing | Confirm no Bluetooth-related device even at /dev |
| | 20131129154107 | Sense in advance before H/W error occurs | Processing | Keep monitoring and perform replacement before a component error occurs |
| | 20131201050951 | phenomenon due to DNS change | End | action of changing URL monitoring |
| | 20131130205300 | Message is generated due to an increase in telnet process usage in association with ISAMS | End | Kill the processor |
| | 20131129154000 | increase in Runqueue due to increase in CPU usage | End | 1. one-call processing when the event is temporary |
| | 20131129221809 | Error occurs in collecting SSADBC.WPRD_PRD_IA_REL, PAT_HR partition table information when collecting statistical information | End | The current DB is going to be upgraded to 11gR2 in EOS version |
| | ⋮ | | | |
| | 20131129173339 | Exceed file system threshold | End | Periodically delete log data and check whether to enable automation |
| | 20131130105104 | Transported goods stand-by Multi Box USPV(29818) 146 GB HDD 1ea Fault | Processing | Strengthen monitoring and keep stock |
| | 20131128175736 | problem URL:http://wcms3.samsung.com/iw-sec/main/product/copy/forwardCopyporduct?siteCode=ie&modelCode=EF-CN900BDEGWW&accessoryTypeBitValue=s& | End | Schedule for exception handling to SR |
| | DATA FIELD 1 | DATA FIELD 2 | DATA FIELD 3 | DATA FIELD 4 |

FIG. 3B

ABNORMAL DATA

| | WRITTEN TIME | CONTENTS OF FAILURE | PROCESSING STATUS | PROCESSING RESULT | |
|---|---|---|---|---|---|
| ① | 20131126184500 | Exceed CPU RUNQUEUE due to excess of CPU usage caused by Push request | Request EBD registration | End | Complete EDB registration as follows 1. One call processing if temporary while event occurs 2. Delete if caused by task 3. Contact server person in charge if continuously sensed. |
| ② | 20131129014450 | ○Cause of occurrence: Exceed a table space threshold due to an increased service usage | | | |
| | | ○Action: Add a 30 GB raw device to a table space: | | | |
| | | ○Current use/usage (%, GB, etc.): 83% | | | |
| | | ○Solution for prevention of recurrence: Periodically check system and table space" | End | | |

FIG. 5A

ABNORMAL DATA

| | WRITTEN TIME | CONTENTS OF FAILURE | PROCESSING STATUS | PROCESSING RESULT |
|---|---|---|---|---|
| ① | 20131126184500 | Exceed CPU RUNQUEUE due to excess of CPU usage caused by Push request | Request EBD registration | Complete EDB registration as follows 1. One call processing if temporary while event occurs 2. Delete if caused by task 3. Contact server person in charge if continuously sensed. |
| ② | 20131129014450 | ○Cause of occurrence: Exceed a table space threshold due to an increased service usage | | End |
| | | ○Action: Add a 30 GB raw device to a table space; | | |
| | | ○Current use/usage (%, GB, etc.): 83% | | |
| | | ○Solution for prevention of recurrence: Periodically check system and table space" | End | |

① Column separation character "," is used in data and thus the column is divided.

② New-line character for dividing a row is included in data and thus the row is wrongly divided

CORRECTION OF ABNORMAL DATA

FIG.5B

RESULT OF CORRECTING AND STRUCTURING ABNORMAL DATA

| WRITTEN TIME | CONTENTS OF FAILURE | | PROCESSING STATUS | PROCESSING RESULT |
|---|---|---|---|---|
| 20131126184500 | Exceed CPU RUNQUEUE due to excess of CPU usage caused by Push request | CORRECT SEPARATION CHARACTER | End | Complete EDB registration as follows 1. One call processing if temporary while event occurs 2. Delete if caused by task 3. Contact server person in charge if continuously sensed. |
| 20131129014450 | ○ Cause of occurrence: Exceed a table space threshold due to an increased service usage<br>○ Action: Add a 30 GB raw device to a table space:<br>○ Current use/usage (%, GB, etc.): 83%<br>○ Solution for prevention of recurrence: Periodically check system and table space | CORRECT NEW-LINE CHARACTER | End | |

① : The same character as the separation character is changed to a predetermined character
(for example, "," (Comma) → "." (Period))

② : The new-line character is changed to a predetermined character (for example, "/n"
(New-line character) → "" (null character)

FIG. 6

| WRITTEN TIME | CONTENTS OF FAILURE | PROCESSING STATUS | PROCESSING RESULT |
|---|---|---|---|
| 20131129153000 | H/W Fault | End | Analyze a cause of a frequent media error by strengthening monitoring/analyzing disk performance |
| 20131121013841 | - Error in PCI control chip of System Board | End | Secure an extra component |
| 20131122160606 | Log caused by multiple login fails | End | No countermeasures to management server |
| 20131129172801 | When using Bluetooth-related device in global device as a Hyper-v device, a kernel message is generated. | End | Confirm no Bluetooth-related device even at /dev |
| 20131129154107 | Sense in advance before H/W error occurs | Processing | Keep monitoring and perform component replacement before a component error occurs |
| 20131201050951 | phenomenon due to DNS change | Processing | action of changing URL monitoring |
| 20131130205300 | Message is generated due to an increase in telnet process usage in association with ISAMS | End | Kill the processor |
| 20131129154000 | increase in Runqueue due to increase in CPU usage | End | 1. one-call processing when the event is temporary |
| 20131129221809 | Error occurs in collecting SSADBC.WPRD_PRD_IA_REL, PAT_HR partition table information when collecting statistical information | End | The current DB is going to be upgraded to 11gR2 in EOS version |
| ... | | | |
| 20131129173339 | Exceed file system threshold | End | Periodically delete log data and check whether to enable automation |
| 20131128175736 | Problem URL:http://wcms3.samsung.com/iw-sec/main/product/copy/forwardCopyporduct?siteCode=ie&modelCode=EF-CN900BDEGWW&accessoryTypeBitValue=2& | End | Schedule for exception handling to SR |
| 20131126184500 | Exceed CPU RUNQUEUE due to excess of CPU usage caused by Push request, Request EBD registration | End | Complete EDB registration as follows 1. One call processing if temporary while event occurs. 2. Delete if caused by task 3. Contact server person in charge if continuously sensed |
| 20131130105104 | Transported goods stand-by Multi Box USPV(29818) 146 GB HDD 1ea Fault, Processing, | Processing | Strengthen monitoring and keep stock |
| 20131129014450 | ○ Cause of occurrence: Exceed a table space threshold due to an increased service usage<br>○ Action: Add a 30 GB raw device to a table space:<br>○ Current use/usage (%, GB, etc.): 83%<br>○ Solution for prevention of recurrence: Periodically check system and table space" | End | |

SYSTEM AND METHOD FOR PROCESSING DATA

CROSS-REFERENCE TO RELATED APPLICATION

This application claims priority to Korean Patent Application No. 10-2014-0065157, filed on May 29, 2014, in the Korean Intellectual Property Office, the disclosure of which is incorporated herein by reference in its entirety.

BACKGROUND

1. Field

Embodiments of the present disclosure relates to a system and method for processing data, and more particularly, to a data processing system and method for automatically processing a data error when massive data is loaded.

2. Discussion of Related Art

In an initial stage for analyzing massive log data, structuring, loading, and storing of data are very important. Data may be loaded or stored appropriately for minimum data structure information for analysis. However, most of the existing log data includes a lot of abnormal data that is not appropriate for the data structure information. In particular, for massive data, the abnormal data may cause a serious error to occur in a data loading process or cause an inaccurate data analysis result to be obtained. In a related art, there is no processing function for automatically correcting or structuring an error when log data is loaded, and the error correction or structuring process is performed manually.

Specifically, when an error occurs during data input, data loading is stopped, a source of the error is found and corrected, and then data loading is performed again from the beginning. If abnormal data is detected several times, the above-described work cannot but be performed repeatedly. Thus, in particular, when massive data is loaded, time and cost may be wasted.

SUMMARY

Embodiments of the present disclosure are directed to data processing systems and methods that efficiently store massive data and automatically process errors included in the data.

According to an aspect of the present disclosure, there is provided a system for processing data, the system including a determiner configured to receive input data and metadata about a structure of the input data and determine whether the input data is normal data or abnormal data based on the metadata; a first storage configured to store the normal data; a second storage configured to store the abnormal data; and a data processor configured to correct the abnormal data stored in the second storage such that the abnormal data has the same structure as the normal data and store the corrected abnormal data in the first storage.

The determiner may determine whether the input data is the normal data or the abnormal data in units of records of the input data.

The metadata may include one or more of information about the number of data fields for each record, information about the number of separators for separating the data fields, and information about a data pattern for each data field.

The determiner may determine whether each record of the input data is the normal data or the abnormal data by comparing one of the number of data fields and the number of separators included in the metadata with one of the number of data fields and the number of separators included in the record of the input data, or by determining whether a data pattern for each data field included in the record of the input data matches a data pattern for a corresponding data field included in the metadata.

The data processor may extract a specific data pattern from the normal data, separate the abnormal data into a plurality of virtual records based on a data field matching the specific data pattern among data fields of the abnormal data, and correct the abnormal data in units of the virtual records.

The data processor may extract at least one specific data value for each data field from the normal data and correct data included in any data field other than the data field having the specific data value among data fields of the virtual record.

The data processor may delete a specific character string or character from the data included in the other data field or may replace the specific character string or character with a predetermined character string or character.

The data processor may determine whether the virtual record is the normal data whenever the virtual record is corrected, store the virtual record in a database of the data processor when the virtual record is determined as the normal data, and store the corrected abnormal data in the first storage when all virtual records are stored in the database.

The data processor may determine whether the virtual record is the normal data whenever the virtual record is corrected and correct all virtual records that have been corrected by then again when the virtual record is not determined as the normal data.

According to another aspect of the present disclosure, there is provided a method of processing data, the method including: receiving, by a determiner, input data and metadata about a structure of the input data; determining, by the determiner, whether the input data is normal data or abnormal data based on the metadata; storing, by the determiner, the normal data in a first storage; storing, by the determiner, the abnormal data in a second storage; correcting, by a data processor, the abnormal data stored in the second storage such that the abnormal data has the same structure as the normal data; and storing, by the data processor, the corrected abnormal data in the first storage.

The determining of whether the input data is the normal data or the abnormal data may include determining whether the input data is the normal data or the abnormal data in units of records of the input data.

The metadata may include one or more of information about the number of data fields for each record, information about the number of separators for separating the data fields, and information about a data pattern for each data field.

The determining of whether the input data is the normal data or the abnormal data may include determining whether each record of the input data is the normal data or the abnormal data by comparing one of the number of data fields and the number of separators included in the metadata with one of the number of data fields and the number of separators included in the record of the input data, or by determining whether a data pattern for each data field included in the record of the input data matches a data pattern for a corresponding data field included in the metadata.

The correcting of the abnormal data may include: extracting a specific data pattern from the normal data; separating the abnormal data into a plurality of virtual records based on a data field matching the specific data pattern among data fields of the abnormal data; and correcting the abnormal data in units of the virtual records.

The correcting of the abnormal data in units of the virtual records may include: extracting at least one specific data value for each data field from the normal data; and correcting data included in any data field other than the data field having the specific data value among data fields of the virtual record.

The correcting of data included in the other data field may include deleting a specific character string or character from the data included in the other data field or replacing the specific character string or character with a predetermined character string or character.

The correcting of the abnormal data in units of virtual records may include: determining whether the virtual record is the normal data whenever the virtual record is corrected, storing the virtual record in a database of the data processor when the virtual record is determined as the normal data, and storing the corrected abnormal data in the first storage when all virtual records are stored in the database.

The correcting of the abnormal data in units of virtual records may include: determining whether the virtual record is the normal data whenever the virtual record is corrected; and correcting all virtual records that have been corrected by then again when the virtual record is not determined as the normal data.

An exemplary embodiment of the instant application is a system for processing data, the system including a determiner configured to receive one or more sets of input data and a set of metadata about a structure of each of the sets of input data, and to determine whether a set of input data is of a normal structure or an abnormal structure based on the set of metadata, the set of input data accordingly being determined to be a set of normal data or a set of abnormal data, respectively; a first storage configured to store the set of normal data; a second storage configured to store the set of abnormal data; and a data processor configured to, in the case that the determiner determines the set of input data to be the set of abnormal data, correct the set of abnormal data stored in the second storage such that the set of abnormal data has the same structure as the set of normal data, thereby forming a set of corrected abnormal data, and to store the set of corrected abnormal data in the first storage.

BRIEF DESCRIPTION OF THE DRAWINGS

The above and other objects and features of the present disclosure will become more apparent to those of ordinary skill in the art by describing in detail exemplary embodiments thereof with reference to the accompanying drawings, in which:

FIGS. 3A and 3B illustrate normal data and abnormal data according to an embodiment of the present disclosure;

FIGS. 5A and 5B are views showing a result of correcting abnormal data such that the abnormal data has the same structure as normal data according to an embodiment of the present disclosure;

FIG. 6 is a view showing a final result of storing and loading input data according to an embodiment of the present disclosure;

DETAILED DESCRIPTION OF EXEMPLARY EMBODIMENTS

Hereinafter, embodiments of the present disclosure will be described in detail with reference to the accompanying drawings. However, this is only exemplary, and the present disclosure is not limited thereto.

In describing the present disclosure, if it is determined that a detailed description of known techniques associated with the present disclosure may unnecessarily obscure the gist of the present disclosure, the detailed description thereof will be omitted. Also, the terms described below are defined in consideration of the functions in the present disclosure, and thus may vary depending on a user, intention of an operator, or custom. Accordingly, the definition would be made on the basis of the whole specification.

The technical scope of the present disclosure is defined by the claims, and the following embodiments are intended only to explain the technical scope of the present disclosure to those who skilled in the art.

Figure 1:
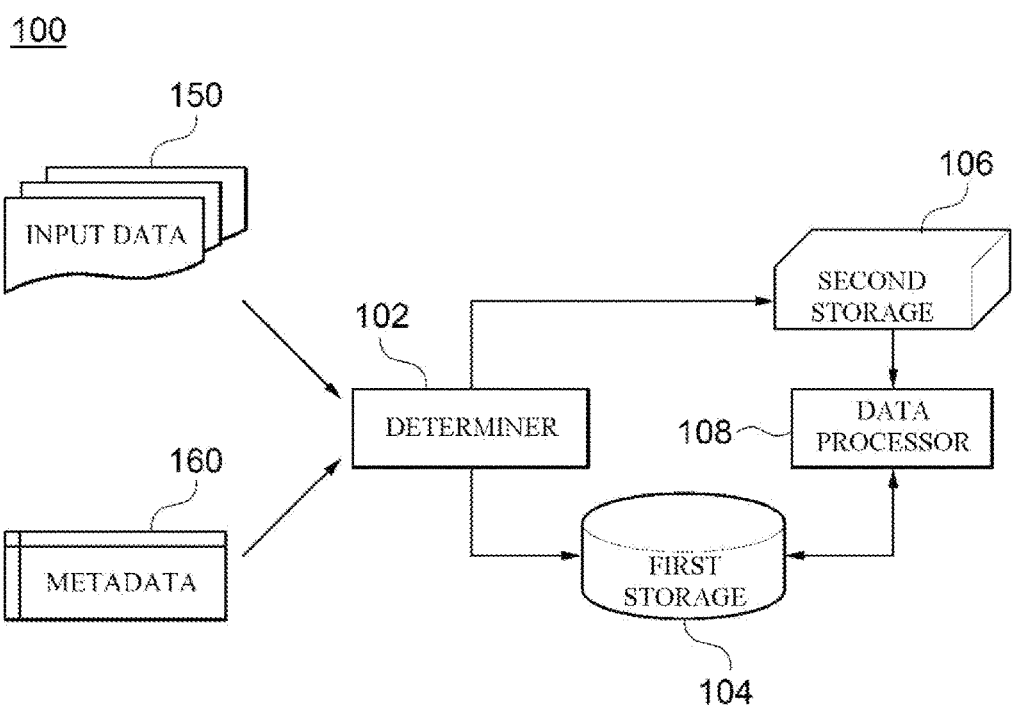
FIG. 1 is a block diagram showing a detailed configuration of a data processing system according to an embodiment of the present disclosure.
Figure 2:
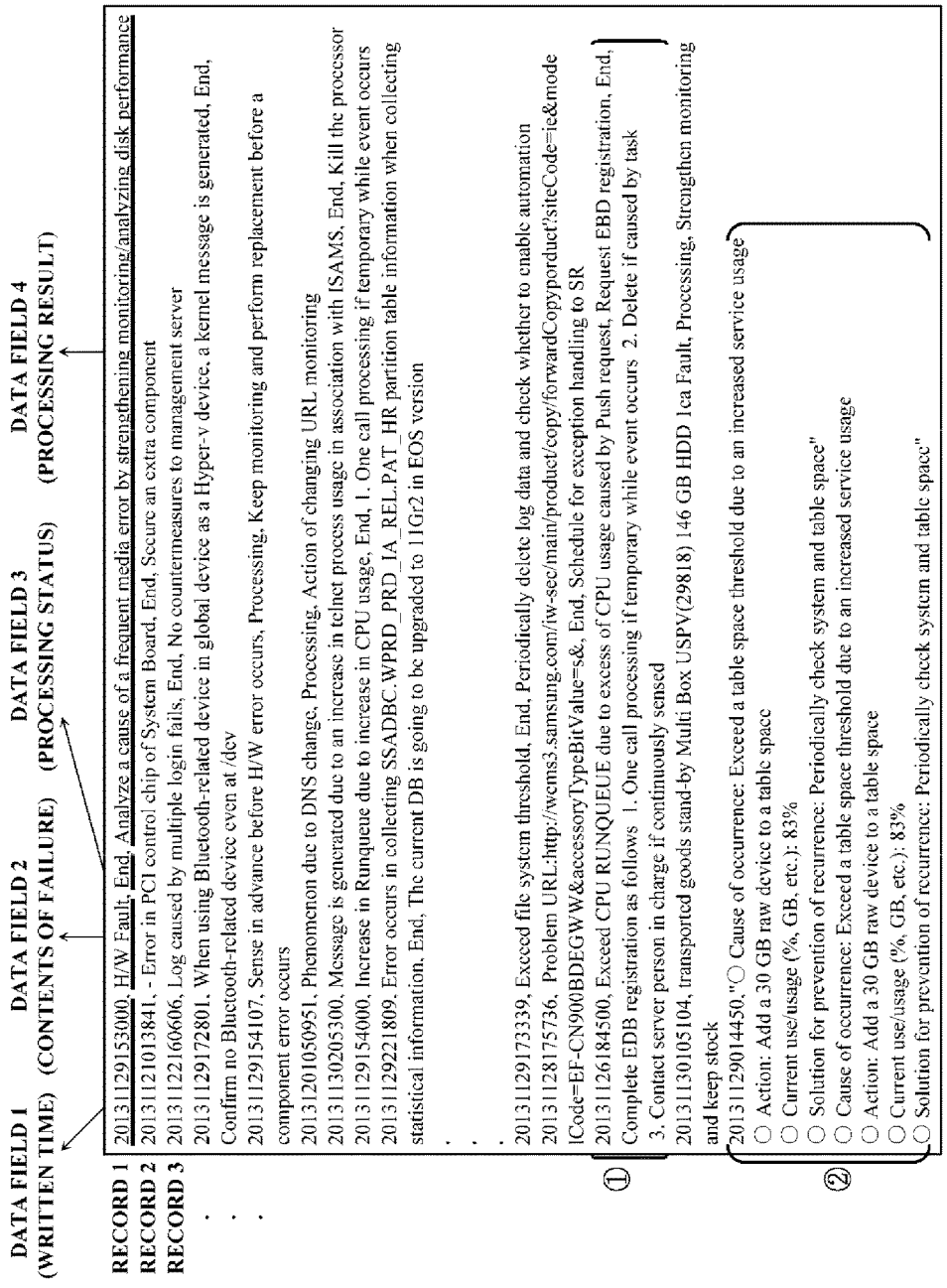
FIG. 2 illustrates input data according to an embodiment of the present disclosure.

FIG. 1 is a block diagram showing a detailed configuration of a data processing system 100 according to an embodiment of the present disclosure, FIG. 2 illustrates input data 150 according to an embodiment of the present disclosure, and FIGS. 3A and 3B illustrate normal data and abnormal data according to an embodiment of the present disclosure.

As shown in FIG. 1, the data processing system 100 according to an embodiment of the present disclosure includes a determiner 102, a first storage 104, a second storage 106, and a data processor 108. In an exemplary embodiment, the determiner 102 and the data processor 108 are implemented via at least one CPU or at least one hardware processor.

The determiner 102 receives one or more sets of input data 150 and a set of metadata 160 about a structure of each of the sets of input data 150 and determines whether a set of input data 150 is of a normal structure or abnormal structure based on the set of metadata 160, the set of input data accordingly being determined to be a set of normal data (i.e. normal data) or a set of abnormal data (i.e. abnormal data), respectively. Here, the set of input data 150 is data to be analyzed, for example, log data of a specific system, data about failure occurrence situations, and the like. The determiner 102 may receive the set of input data 150 from, for example, a management server (not shown) inside the data processing system 100 or a target system (not shown) outside the data processing system 100.

Referring to FIGS. 2, 3A and 3B, the set of input data 150 may be configured in units of records (i.e. records), and each record of the set of input data 150 may have a plurality of data fields. Here, each data field may include data corresponding to, for example, a written time, contents of failure, a processing status, a processing result, and the like. For example, each data field may include data such as a written time: "20131129153000," contents of failure: "H/W Fault," a processing status: "End," a processing result: "Analyze a cause of a frequent media error by strengthening monitoring and analyzing disk performance." The data for each data field may be separated using a separator, for example, a comma. The determiner 102 may sequentially receive the set of input data in units of records. In addition, the determiner 102 may determine whether the set of input data 150 is of the normal structure or the abnormal structure on a per-record basis for one or more records of the set of input data 150.

The normal data is data that conforms to a predetermined data structure while the abnormal data is data that does not conform to the predetermined data structure. FIG. 3A is a view showing an example of normal data, and FIG. 3B is a view showing an example of abnormal data. As shown in FIGS. 3A and 3B, the normal data has the predetermined data structure and thus may be stored and loaded in a normal form. However, the abnormal data ① and ② shown in FIG. 2 and ① and ② shown in FIG. 3B) has a data structure that does not conform to the predetermined data structure because of a special character (for example, ",") and a new-line character (for example, "/n") and thus may be stored and loaded in an abnormal form. Specifically, for ① of FIGS. 2 and 3B, a separator "," is used between data of "Exceed CPU RUNQUEUE due to an excess of a CPU usage caused by a Push request" and data of "Request EBD registration" to perform division of columns (data fields) at an unintended part. For ② of FIGS. 2 and 3B, a new-line character "/n" is used between data of "○ Cause of occurrence: Exceed a table space threshold due to an increased service usage" and data of "○ Action: Add a 30 GB raw device to a table space" to perform division of rows (records) at an unintended part. As seen in FIG. 3B, the abnormal data has a structure different from that of the normal data and thus may be stored and loaded in an abnormal form.

In order to determine whether the set of input data 150 is the normal data or abnormal data, the determiner 102 may receive the set of input data in addition to the set of metadata 160 about a structure of the set of input data 150. Generally, the set of metadata is called structured data about data, that is, data for describing other data, and denotes data that is provided to content (here, the set of input data 150) according to a specific rule in order to efficiently retrieve and use needed information from massive information. The set of metadata 160 according to embodiments of the present disclosure includes information about a structure of the set of input data 150. Specifically, the set of metadata 160 may include at least one of information about the number of data fields for each record of the set of input data 150, information about the number of separators for separating the data fields included in a record of the set of input data 150, and information about a data pattern for each data field of the set of input data 150. That is, the set of metadata 160 may reveal how many data fields should be included for each record of the set of input data 150, how many separators should be included for each record of the set of input data 150, and which pattern should be included for each data field.

The determiner 102 may determine whether each record of the set of input data 150 is normal data or abnormal data by comparing one of the number of data fields or the number of separators included in the record of the set of input data 150 with one of the number of data fields or the number of separators included in metadata 160. For example, when it is assumed that the number of data fields for each record, which is set in the set of metadata 160, is 4, the determiner 102 may determine whether each record is normal data or abnormal data by calculating the number of data fields included in the record of the set of input data 150 and then comparing the number with the number (4) of data fields included in the set of metadata 160. If the number of data fields included in the record of the set of input data 150 that is calculated by the determiner 102 is equal to the number of data fields included in the set of metadata 160, the determiner 102 may determine the record of the set of input data 150 as normal data. However, if the number of data fields included in the record of the set of input data 150 that is calculated by the determiner 102 is not equal to the number of data fields included in the set of metadata 160, the determiner 102 may determine the record of the set of input data 150 as abnormal data. In addition, the determiner 102 may also determine whether each record is normal data or abnormal data by calculating the number of separators included in the record of the set of input data 150 and then comparing the number with the number of separators included in the set of metadata 160.

Furthermore, the determiner 102 may also determine whether each record of the set of input data 150 is normal data or abnormal data by determining whether a data pattern for each data field included in the record of the set of input data 150 matches a data pattern for a corresponding data field included in the set of metadata 160. As described above, the set of metadata 160 may include information about a data pattern for each data field. For example, a beginning part (a data field for a "written time") of a record of the normal data may always have a pattern having a number string including 14 numbers such as "YYYYMMD-Dhhmmss" (here, Y is a year, M is a month, D is a day, h is an hour, m is a minute, s is a second). In addition, each of data fields for "contents of failure," "processing status," and "processing result" may have a pattern having a character string. In particular, the data field for "processing status" may have a pattern having a character string including three characters ("End") or ten characters ("Processing"). As such, the set of metadata 160 includes information about a data pattern for each data field. The determiner 102 may also determine whether a data pattern for each data field included in the record of the set of input data 150 matches a data pattern for a corresponding data field included in the set of metadata 160 and determine the record as normal data when the data patterns match each other. However, when a data pattern of even any one of the data fields included in the record of the set of input data 150 does not match a data pattern for a corresponding data field included in the set of metadata 160, the determiner 102 may determine the record as abnormal data. Through the above process, the determiner 102 may determine whether the set of input data 150 is of the normal structure or the abnormal structure on a per-record basis for one or more records of the set of input data 150. However, the above-described method of determining whether the set of input data 150 is normal data or abnormal data is merely an example, and thus the determiner 102 does not necessarily use the above-described method to determine the set of input data 150 as normal data or abnormal data. The determiner 102 may determine the set of input data 150 as normal data or abnormal data through various methods.

Subsequently, the determiner 102 stores the normal data, which is determined through the above process, in the first storage 104 and stores the abnormal data in the second storage 106. That is, the determiner 102 may classify the set of input data 150 into the normal data and the abnormal data in the data reception step and then store the normal data and the abnormal data in respective separate storage units.

The first storage 104 is configured to store normal data and may receive the normal data from the determiner 102 and sequentially store and load the received normal data. In this case, the first storage 104 may store and load the normal data in units of records. In addition, as described below, the first storage 104 may receive abnormal data corrected by the data processor 108 and sequentially store and load the abnormal data.

The second storage 106 is configured to store abnormal data and may receive the abnormal data from the determiner 102 and sequentially store and load the received abnormal data. The data processor 108 may correct the abnormal data stored in the second storage 106, convert the corrected abnormal data into normal data, and store the converted normal data in the first storage 104 again. That is, the second storage 106 serves to temporarily store the abnormal data.

The data processor 108 may, in the case that the determiner determines the set of input data to be the set of abnormal data, correct the abnormal data stored in the second storage 106 such that the abnormal data has the same structure as the normal data, thereby forming a set of corrected abnormal data, and store the corrected abnormal data in the first storage 104.

First, the data processor 108 extracts a specific data pattern form a data field of the normal data stored in the first storage 104. As described above, data having the specific pattern is included in each data field of the set of input data. For example, a beginning part (a data field for a "written time") of a record of the set of input data may always have a pattern having a number string including 14 numbers such as "YYYYMMDDhhmmss." The data processor 108 may extract any specific data pattern from the normal data.

The data processor 108 may match the data field of the abnormal data with the extracted data pattern. For example, the data processor 108 may read the abnormal data until data of a part matching the pattern of "YYYYMMDDhhmmss" is found while the abnormal data is read. The data processor 108 may match the data field in the abnormal data with the pattern that is extracted using, for example, a number string or character string matching algorithm. The data processor 108 may separate the abnormal data into a plurality of virtual records based on the data field that matches the extracted specific data pattern among the data fields of the abnormal data. For example, when a pattern of "YYYYMMDDhhmmss" is found in the abnormal data 5 times, the data processor 108 may separate the abnormal data into five virtual records based on the data field in which the pattern of "YYYYMMDDhhmmss" is found. Since a special character such as a separator "," is unintentionally included in the abnormal data unlike the normal data, the data field in the record of the abnormal data may not match the data field in the record of the normal data. Thus, according to embodiments of the present disclosure, the data processor 108 may separate the abnormal data into a plurality of virtual records using the data pattern extracted from the normal data. That is, the data processor 108 may separate the abnormal data into a plurality of virtual records based on a point (data field) at which the specific pattern is extracted from the abnormal data, and may sequentially correct the abnormal data in one or more virtual records of the plurality of virtual records.

Next, the data processor 108 may use a specific data value of the normal data in order to correct each virtual record. The data processor 108 may extract one or more specific data values for each data field from the normal data. A different number of data values may be included in each data field of the normal data. For example, a first data field is data for "nationality" and may include three pieces of data including "Korea," "United States," and "Japan." In addition, a second data field is data for "gender" and may include two pieces of data including "Male" and "Female." In addition, a third data field is data for "processing result" and may include 20 pieces of data including "Action of changing a URL monitoring," "Secure an extra component," and the like.

The data processor 108 may extract a data value (for example, "Korea," "United States," and "Japan" in the first data field/"Male" and "Female" in the second data field/ "Action of changing a URL monitoring," "Secure an extra component," and the like in the third field) for each data field from the normal data and match the extracted data values with a corresponding data field in a virtual record of the plurality of virtual records. For example, the data processor 108 may determine whether any one of "Korea," "United States," and "Japan" in the first data field of the normal data is included in the data field of the abnormal data and consider the data field in the abnormal data including any one of "Korea," "United States," and "Japan" to match the normal data. Subsequently, the data processor 108 may consider the matching data field to be normal and perform correction on only the mismatching data field. That is, the data processor 108 may perform correction on data fields determined to not have the extracted specific data value among data fields in the virtual record. For example, when it is assumed that 10 data fields are included in one virtual record, first to fifth, seventh and eighth, and tenth data fields may have the specific data value extracted from the normal data while sixth and ninth data fields may not have the specific data value extracted from the normal data. In this case, the data processor 108 may perform correction on only the sixth and ninth data fields not having the specific data value extracted from the normal data. Here, it has been described that the data processor 108 determines whether to correct each data field of the virtual record using all data values included in the data field of the normal data. However, this is merely one embodiment, and thus the data processor 108 may determine whether to correct each data field of the virtual record using only some data values among data included in the data field of the normal data. For example, the data processor 108 may determine whether to correct each data field of the virtual record using one or more specific data values that frequently appear in each data field of the normal data.

In addition, the data processor 108 may determine whether to correct each data field in consideration of the number of pieces of data for each data field of the normal data in the process of matching the specific data value extracted from the normal data with a corresponding data field in the virtual record. For example, when it is assumed that the number of pieces of data included in the first data field of the normal data is two, the number of pieces of data included in the second data field is five, and the number of pieces of data included in the third data field is four, first, the data processor 108 may determine whether data included in the first data field having a smallest number of pieces of data is included in the virtual record. Subsequently, the data processor 108 may sequentially determine whether data included in the third data field and then the second data field which have a greater number of pieces of data is included in the virtual record. When the data field has a small number of pieces of data, the matching with the data field in the virtual record may be relatively easy. When the data field has a large number of pieces of data, an error occurrence possibility may be high, and it may take a relatively long time to perform the matching. Thus, the data processor 108 may sequentially perform matching with a virtual record, beginning with a data field having a smallest number of pieces of data.

Through the above process, the data processor 108 may determine the data field to be corrected from among data fields included in the virtual record. According to embodiments of the present disclosure, the data processor 108 may efficiently detect an error point in the abnormal data using a data pattern and a data value of the normal data.

Next, the data processor 108 may correct data included in the data field that is determined to be corrected. The data field may include an unintended special character (for example, ","), new-line character (for example, "/n"), and the like. The data processor 108 may correct the data by deleting a specific character string (including a number string) or a specific character (including a number) from the data included in the data field that is determined to be corrected or replacing the character string or character with a predetermined character string or character. The data processor 108 may convert a problematic special character, symbol, and upper/lower case into another special character, symbol, and upper/lower case using a widely known text conversion technique. The data processor 108 may correct data included in the data field that is determined to be corrected using various data conversion techniques, and does not perform the data conversion using only a specific data conversion technique.

The data processor 108 may correct the virtual record through the above process and whenever one virtual record is corrected, determine whether the corrected virtual record is normal data. If the corrected virtual record is determined as the normal data (i.e. the virtual record is determined to be of the normal structure), the data processor 108 may store the virtual record determined as the normal data in an internal database (not shown). The data processor 108 may perform correction on the other virtual record through the above-described process and then sequentially store the virtual records determined as the normal data in the internal database. In this case, when the corrected virtual record is not determined as the normal data, the data processor 108 may repeatedly correct all the virtual records that have been corrected by the time of correction of the virtual record. That is, the data processor 108 may track an error part through a backtracking process and perform the correction again, beginning with the error part. Since an erroneous result may be generated due to an error that is not found while the data is corrected, the data processor 108 may perfectly convert the abnormal data into the normal data by verifying the modified virtual record one more time.

Here, the data processor 108 may determine whether the corrected virtual record is the normal data based on the above-described metadata. For example, the data processor 108 may determine whether the virtual record is the normal data or abnormal data by comparing the number of data fields or separators included in the set of metadata with the number of data fields or separators included in the virtual record or determining whether a data pattern for each data field included in the set of metadata matches a data pattern for a corresponding data field included in the virtual record. However, the method of determining whether the virtual record is the normal data or the abnormal data is not limited thereto, and the data processor 108 may determine whether the virtual record is the normal data through various methods.

When all the corrected virtual records are stored in the database in the data processor 108, that is, when all the corrected virtual records are determined as the normal data, the data processor 108 may store the corrected abnormal data in the first storage 104. In this case, the data processor 108 may sequentially store the corrected abnormal data in the first storage 104 in units of records (or virtual records).

Figure 4:
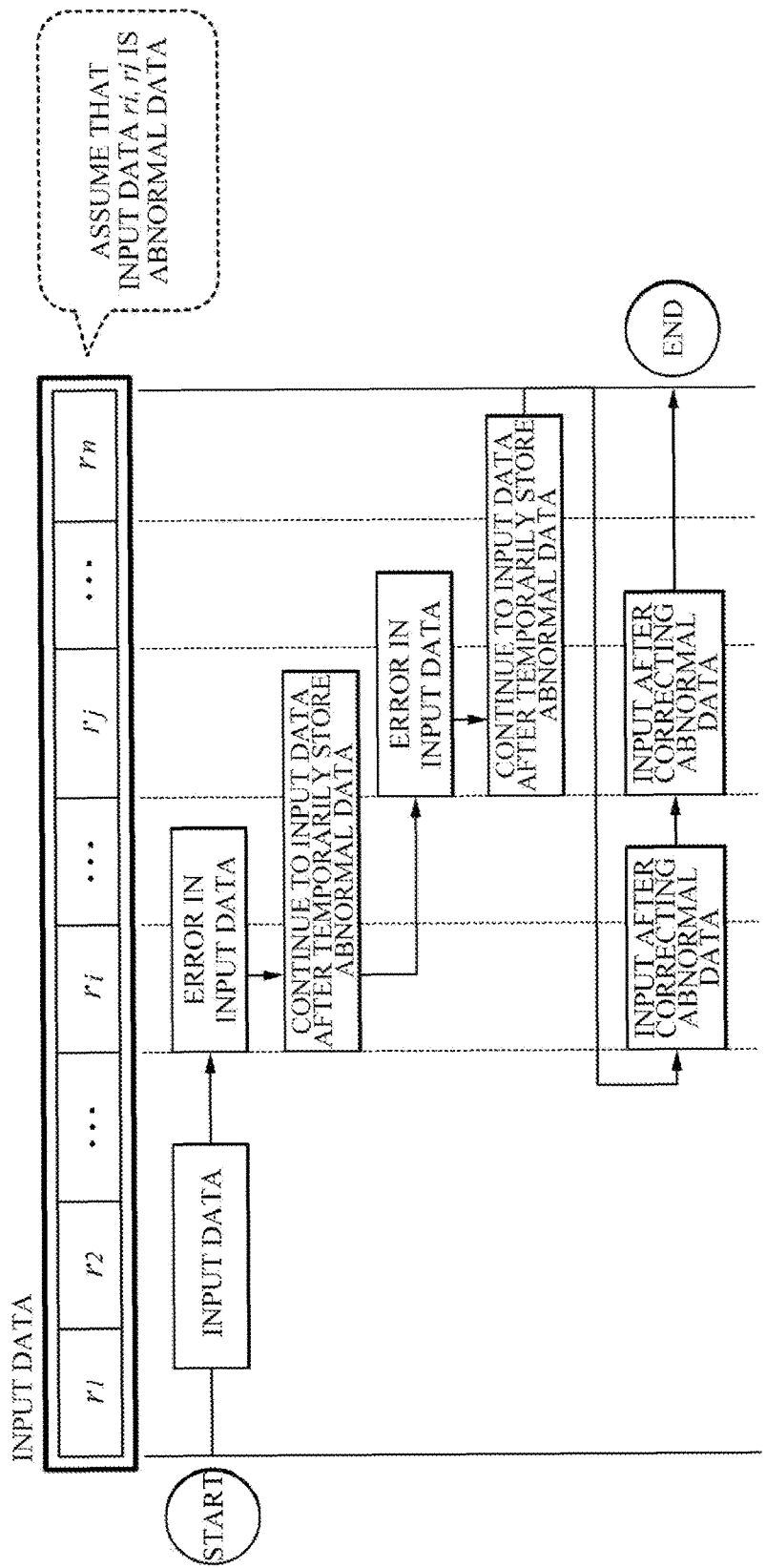
FIG. 4 is a view schematically showing a data processing process according to an embodiment of the present disclosure.

FIG. 4 is a view schematically showing a data input process according to an embodiment of the present disclosure.

Referring to FIG. 4, the data processing system 100 according to embodiments of the present disclosure temporarily stores abnormal data in the second storage 106 and continues to perform data input when the abnormal data is found. In this process, the normal data is stored in the first storage 104. When the input of the normal data is completed, the correction is performed on the abnormal data that is stored in the second storage 106. That is, according to embodiments of the present disclosure, the data processing system 100 may prevent a delay in the data processing time, in advance, due to an input error of the abnormal data. This may prevent storing and loading of data from being stopped due to the abnormal data, and thus does not need to invalidate the normal data that is previously stored. In addition, it is possible to prevent unnecessary storing and repetitive loading.

FIGS. 5A and 5B are views showing a result of correcting abnormal data such that the abnormal data has the same structure as normal data according to an embodiment of the present disclosure.

FIG. 5A is a view showing an example of the above-described abnormal data. As described above, a first record ① is determined as the abnormal data that does not have a predetermined data structure because the first record ① includes a separator "," in a specific data field and the data field is unintentionally separated. A second record ② is determined as the abnormal data that does not have the predetermined data structure because the second record ② includes a new-line character for dividing a row in a specific data field and the row is wrongly divided.

FIG. 5B is a view showing a result of correcting the abnormal data in the portion (a) to convert the abnormal data into the normal data. For the first record ①, another special character "." is replaced with the separator "," that is positioned between data of "Exceed CPU RUNQUEUE due to an excess of a CPU usage caused by a Push request" and data of "Request EBD registration." For the second record ②, a null character " " is replaced with the new-line character "/n" that is positioned between data of "○ Cause of occurrence: Exceed a table space threshold due to an increased service usage" and data of "○ Action: Add a 30 GB raw device to a table space." However, the correction method is merely one embodiment, and the data processor 108 may correct data in the record to be corrected using various methods.

FIG. 6 is a view showing a final result of storing and loading a set of input data according to an embodiment of the present disclosure. The abnormal data that is corrected through the above-described process may be stored in the first storage 104. Referring to FIG. 6, existing abnormal data is converted into normal data through a correction process by the data processor 108. That is, it can be seen that the existing abnormal data have been converted to have the same structure as the normal data.

Figure 7:
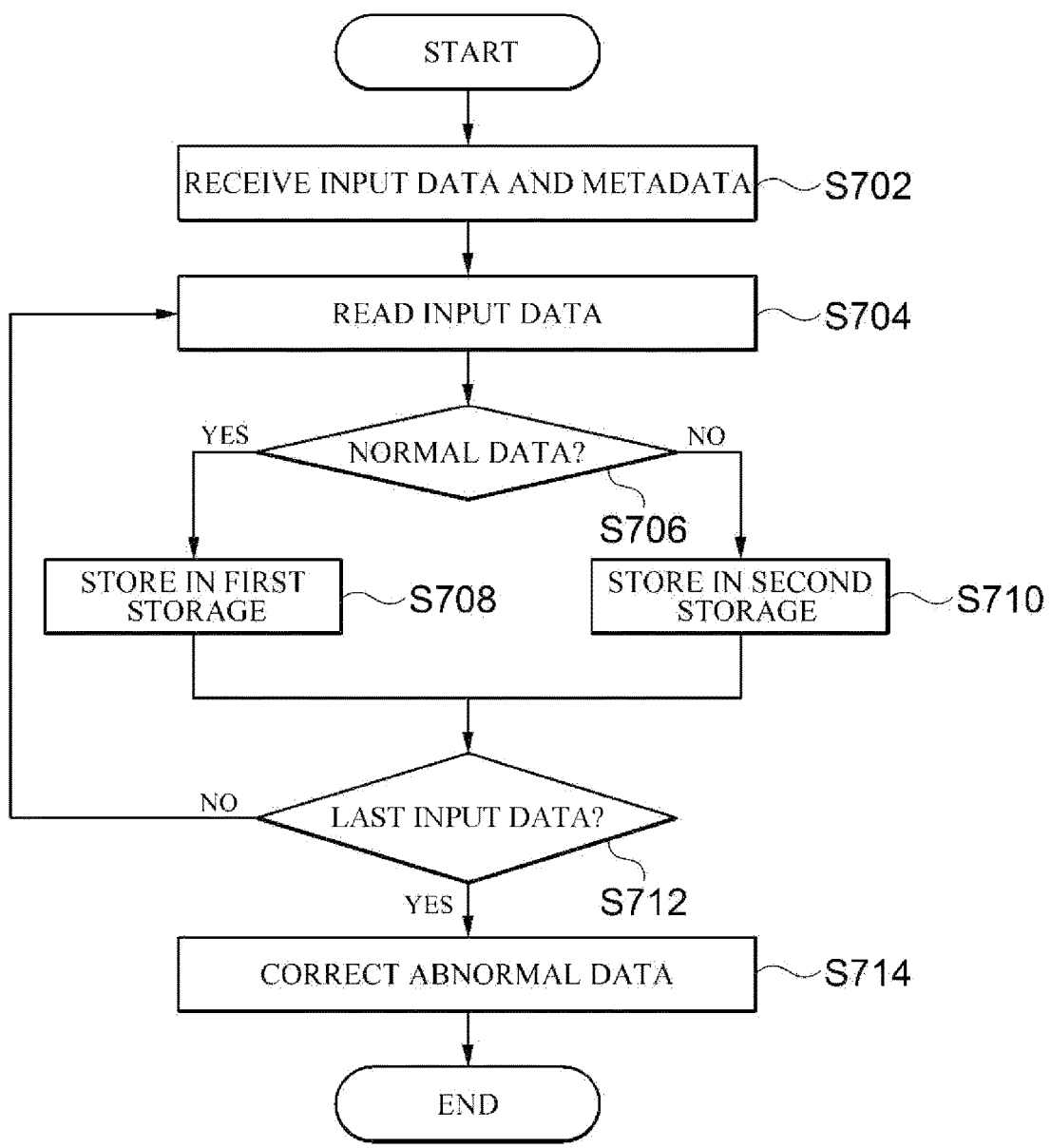
FIG. 7 is a flowchart for describing a data processing method according to an embodiment of the present disclosure.

FIG. 7 is a flowchart for describing a data processing method according to an embodiment of the present disclosure. First, the determiner 102 of the data processing system 100 receives a set of input data and metadata about a structure of the set of input data (S702). Here, the set of input data 150 is data to be analyzed, for example, log data of a specific system, data about failure occurrence situations, and the like. The set of metadata 160 may be information about the structure of the set of input data 150 and include at least one of information about the number of data fields for each record of the one or more records of the set of input data, information about the number of separators for separating the data fields, and information about a data pattern for each data field.

In addition, the determiner 102 reads the set of input data (S704) and then determines whether the set of input data is of a normal structure or abnormal structure based on the set of metadata, the set of input data accordingly being determined to be a set of normal data or a set of abnormal data, respectively (S706). A process of determining whether the set of input data is the normal data or the abnormal data will be described in detail with reference to FIGS. 8 and 9.

Next, the determiner 102 stores the normal data in the first storage 104 (S708) and stores the abnormal data in the second storage 106 (S710). That is, the determiner 102 may classify the set of input data 150 into the normal data and the abnormal data in the data reception step and then store the normal data and the abnormal data in respective separate storage. Here, it has been described that the determiner 102 stores the normal data in the first storage 104 and then stores the abnormal data in the second storage 106. However, the present disclosure is not limited thereto, and the determiner 102 may store the abnormal data in the second storage 106 and then store the normal data in the first storage 104 or store the normal data and the abnormal data in the first storage 104 and the second storage 106 at the same time, respectively.

The determiner 102 sequentially receives the set of input data, and determines whether the set of input data is last (S712). When the set of input data is not last, the method returns to S704 and repeats the above-described operations.

When the set of input data is last, the data processor 108 corrects the abnormal data stored in the second storage 106 such that the abnormal data has the same structure as that of the normal data (S714). A process of the data processor 108 correcting the abnormal data will be described in detail with reference to FIG. 10.

Figure 8:
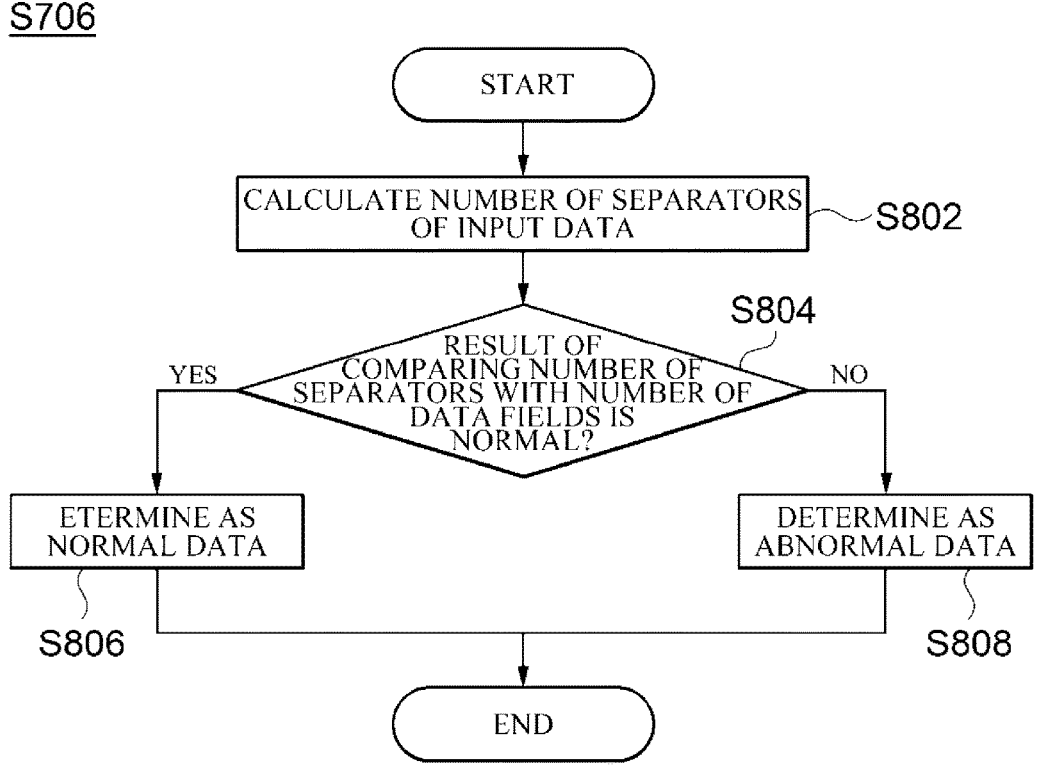
FIG. 8 is a flowchart for describing an exemplary embodiment of S706 of FIG. 7.

FIG. 8 is a flowchart for describing an exemplary embodiment of S706 of FIG. 7. First, the determiner 102 calculates the number of spacers included in the set of input data (S802). The separator is a character, symbol, sign, and the like for separating each data field of the set of input data, and may be, for example, a comma ",".

Next, the determiner 102 compares the number of separators included in the set of input data with the number of data fields included in the set of metadata (S804).

If the number of separators included in the set of input data is equal to the number of data fields included in the set of metadata (when it is assumed that a separator is also included in a rear end of the data field of the set of input data), the determiner 102 determines the set of input data as the normal data (S806). However, the present disclosure is not limited thereto, and when the number of separators included in the set of input data is less by one than the number of data fields included in the set of metadata (when it is assumed that the separator is included only between the data fields of the set of input data), the determiner 102 may determine the set of input data as the normal data.

If the number of separators included in the set of input data is not equal to the number of data fields included in the set of metadata, the determiner 102 may determine the set of input data as the abnormal data (S808). Here, it has been described that the determiner 102 determines whether set of the input data is the normal data or the abnormal data by comparing the number of separators included in the set of input data with the number of data fields included in the set of metadata. However, this is merely one embodiment. For example, the determiner 102 may determine whether the set of input data is the normal data or the abnormal data by comparing the number of data fields included in the set of input data with the number of data fields included in the set of metadata.

Figure 9:
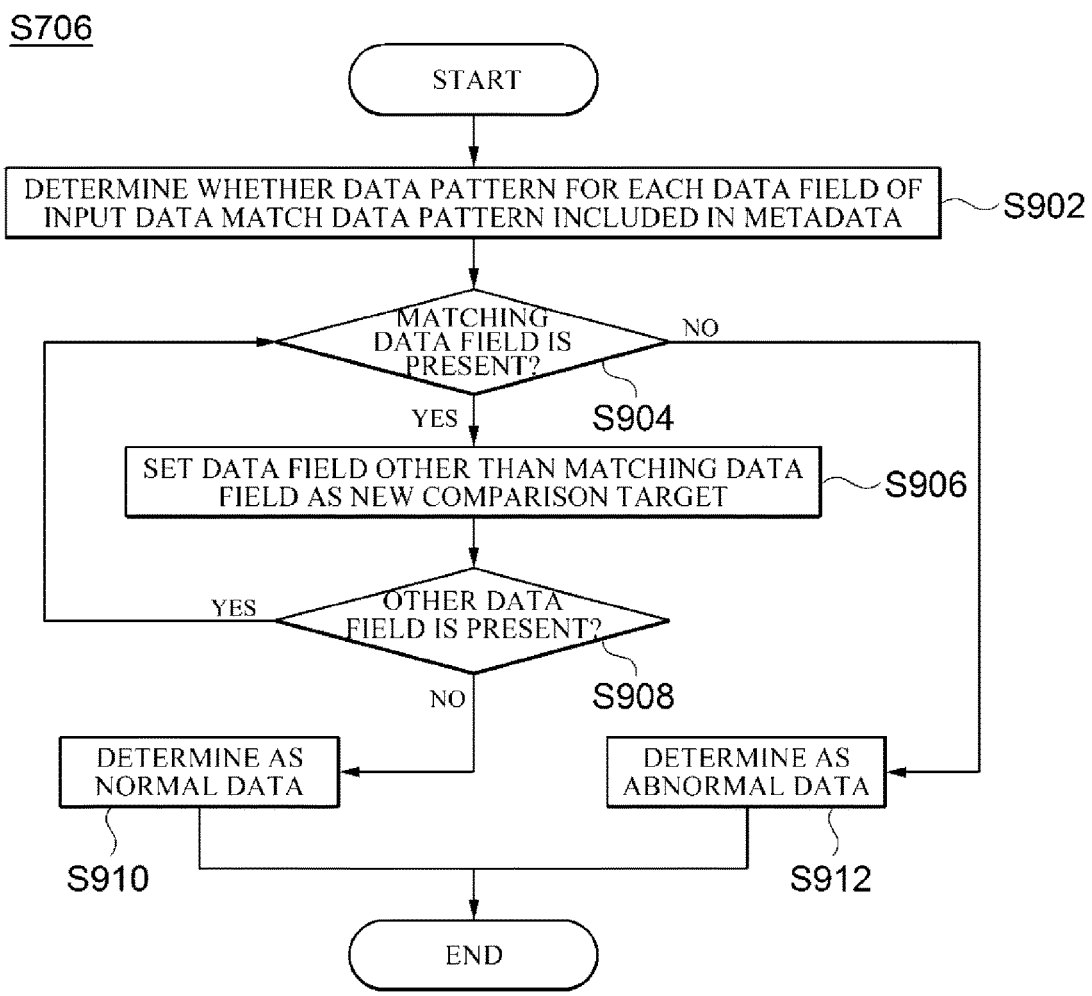
FIG. 9 is a flowchart for describing another exemplary embodiment of S706 of FIG. 7.

FIG. 9 is a flowchart for describing another exemplary embodiment of S706 of FIG. 7. First, the determiner 102 determines whether a data pattern for each data field included in the record of the set of input data matches a data pattern for a corresponding data field included in the set of metadata (S902, S904).

If there is a data field matching the data pattern included in the set of metadata among the data fields included in the record of the set of input data, the determiner 102 sets a data field of the set of input data other than the matching data field as a new comparison target (S906).

In this process, the determiner 102 determines whether there is any remaining comparison target (S908). If there is a remaining comparison target, the determiner 102 determines whether there is a data field matching the data pattern included in the set of metadata among the data fields of the set of input data other than the pre-matching data field. That is, the method is repeatedly performed again from S904.

If there is no remaining comparison target, the determiner 102 determines the set of input data as the normal data (S910).

On the other hand, in S904, when there is no data field matching the data pattern included in the set of metadata among the data fields included in the record of the set of input data, the determiner 102 determines the set of input data as the abnormal data (S912).

Figure 10:
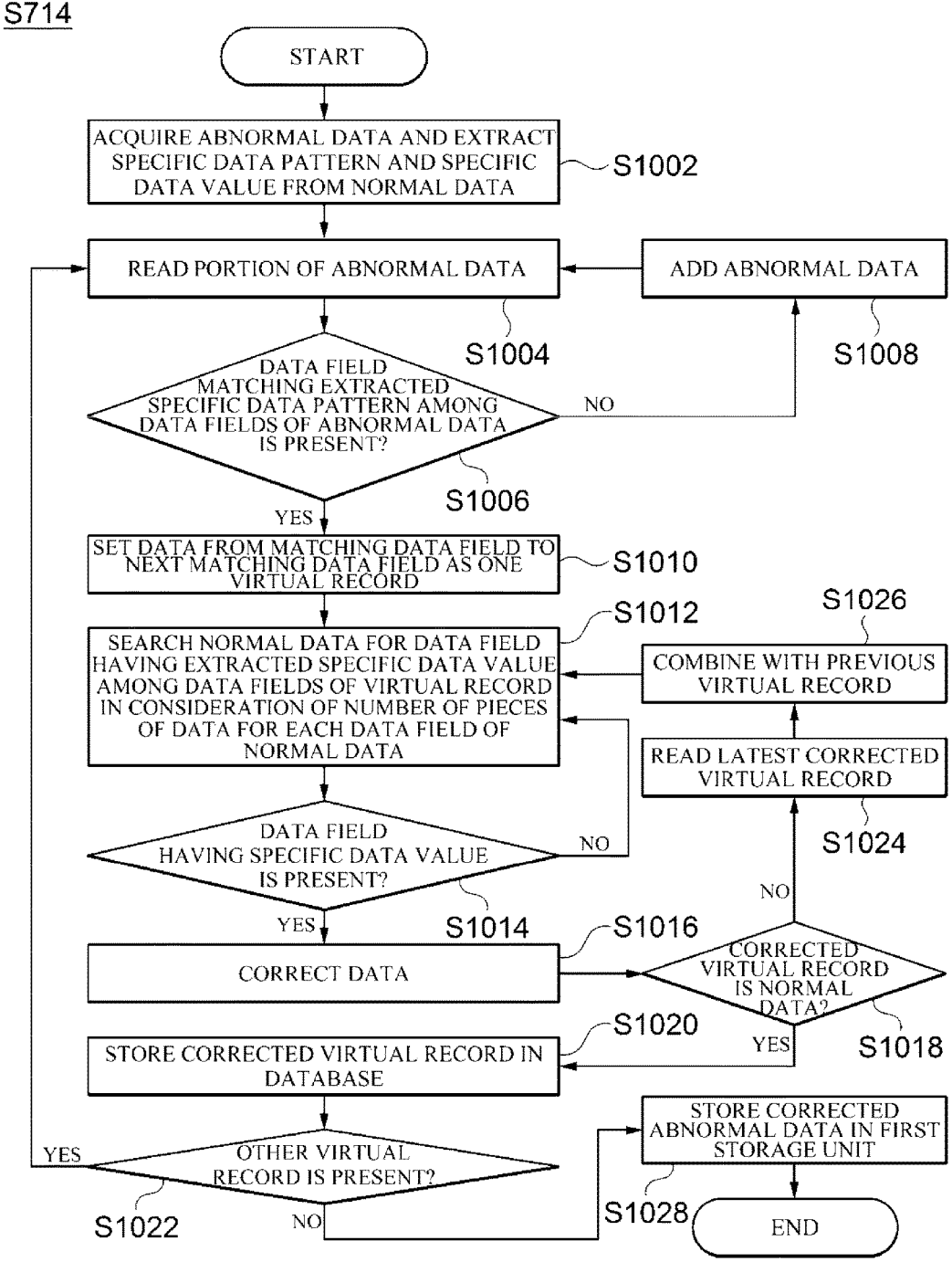
FIG. 10 is a flowchart for describing an exemplary embodiment of S714 of FIG. 7.

FIG. 10 is a flowchart for describing an exemplary embodiment of S714 of FIG. 7. First, the data processor 108 acquires the abnormal data stored in the second storage 106 and extracts a specific data pattern and a data-field based specific data value from the normal data stored in the first storage 104 (S1002). As described above, data having the specific pattern is included in each data field of the set of input data. For example, a beginning part (a data field for a "written time") of a record of the set of input data may always have a pattern having a number string including 14 numbers such as "YYYYMMDDhhmmss." The data processor 108 may extract any specific data pattern from the normal data. In addition, a different number of data values may be included in each data field of the normal data, and the data processor 108 may extract one or more specific data values (for example, "Korea," "United States," and "Japan"/"Male" and "Female"/"Action of changing a URL monitoring," "Secure an extra component," and the like) from each data field of the normal data.

Next, the data processor 108 reads a portion of the abnormal data (S1004), and then searches the abnormal data for a data field matching the extracted specific data pattern among the data fields (S1006).

If the data field matching the extracted specific data pattern is not found, the data processor 108 searches an additional range of the abnormal data until the matching data field is found (S1008).

If the data field matching the extracted specific data pattern is found, the data processor 108 sets data from the matching data field to a next data field matching the extracted specific data pattern as one virtual record (S1010). For example, when a pattern of "YYYYMMDDhhmmss" is found in the abnormal data 5 times, the data processor 108 may set the abnormal data as five virtual records based on the data field in which the pattern of "YYYYMMDDhhmmss" is found. The data processor 108 may sequentially correct the abnormal data in one or more virtual records of the virtual records.

Next, the data processor 108 searches the virtual record for the data field having a specific data value extracted from the normal data among the data fields in consideration of the number of pieces of data for each data field of the normal data (S1012, S1014). For example, when it is assumed that the number of pieces of data included in the first data field of the normal data is two, the number of pieces of data included in the second data field is five, and the number of pieces of data included in the third data field is four, first, the data processor 108 may determine whether data included in the first data field having a smallest number of pieces of data is included in the virtual record. Subsequently, the data processor 108 may sequentially determine whether data included in the third data field and then the second data field which have a greater number of pieces of data is included in the virtual record. When the data field has a small number of pieces of data, the matching with the data field in the virtual record may be relatively easy. When the data field has a large number of pieces of data, an error occurrence possibility may be high, and it may take a relatively long time to perform the matching. Thus, the data processor 108 may sequentially perform matching with the virtual record, beginning with a data field having a smallest number of pieces of data.

Next, the data processor 108 may correct data included in the data field that is determined to be corrected (S1016). The data processor 108 may correct the data by deleting a specific character string or specific character from the data included in the data field that is determined to be corrected or replacing the character string or character with a predetermined character string or character. The data processor 108 may convert a problematic special character, a sign, and an upper/lower case into another special character, sign, and upper/lower case using a widely known text conversion technique.

Next, the data processor 108 may determine whether the corrected virtual record is normal data (S1018). That is, whenever one virtual record is corrected, the data processor 108 may determine whether the corrected virtual record is the normal data (i.e. the) virtual record is determined to be of the normal structure). The data processor 108 may determine whether the corrected virtual record is the normal data based on the above-described metadata. For example, the data processor 108 may determine whether the virtual record is the normal data or abnormal data by comparing the number of data fields or separators included in the set of metadata with the number of data fields or separators included in the virtual record or determining whether a data pattern for each data field included in the set of metadata matches a data pattern for a corresponding data field included in the virtual record.

If the corrected virtual record is determined as the normal data (i.e. the) virtual record is determined to be of the normal structure), the data processor 108 may store the virtual record determined as the normal data in an internal database (not shown) (S1020).

The data processor 108 may determine whether there is any remaining virtual record (S1022), and when there is a remaining virtual record, the data processor 108 returns to S1004 to perform correction on the other virtual record through the above-described process and then sequentially store the virtual records determined as the normal data in the internal database.

On the other hand, when the corrected virtual record is not determined as the normal data, the data processor 108 may read the latest corrected virtual record (S1024), and then combine the virtual record with a previous virtual record (S1026). That is, the data processor 108 returns to S1012 in order to again correct all the virtual records that have been corrected by the time of correction of the virtual record. The data processor 108 may track an error part through a backtracking process and perform the correction again, beginning with the error part. Since an erroneous result may be generated due to an error that is not found while the data is corrected, the data processor 108 may perfectly convert the abnormal data into the normal data by verifying the modified virtual record one more time.

On the other hand, when there is no remaining virtual record, the data processor 108 stores the corrected abnormal data in the first storage 104 (S1028). In this case, the data processor 108 may sequentially store the abnormal data in the first storage 104 in units of records.

The methods shown in FIGS. 7 to 10 may be performed by the data processing system 100. In the shown flowcharts, the method has been described to have a plurality of operations. However, at least some of the operations may be performed in an exchanged order, performed in combination with another operation, omitted, divided into sub-operations and then performed, or performed in addition to one or more operations that are not shown. Furthermore, according to an embodiment, one or more steps that are not shown may be performed in addition to the methods.

According to embodiments of the present disclosure, the normal data may continue to be received while the abnormal data is temporarily stored in the second storage in the data reception process, thereby preventing a delay in the data processing time due to an input error of the abnormal data. This may prevent storing and loading of data from being stopped due to the abnormal data, and thus does not need to invalidate the normal data that is previously stored. In addition, it is possible to prevent unnecessary storing and repetitive loading.

In addition, according to embodiments of the present disclosure, an error point may be efficiently detected in the abnormal data using a data pattern and a data value of the normal data.

Although the disclosure has been described with reference to exemplary embodiments, it will be understood by those skilled in the art that various changes may be made without departing from the spirit or scope of the disclosure.

Thus, the scope of the present disclosure is to be determined by the following claims and their equivalents, and shall not be restricted or limited by the foregoing detailed description.

What is claimed is:

1. A system for processing data, the system comprising:
a determiner configured to receive one or more sets of input data and a set of metadata about a structure of each of the sets of input data, and to determine whether a set of input data is of a normal structure or an abnormal structure based on the set of metadata, the set of input data accordingly being determined to be a set of normal data or a set of abnormal data, respectively;
a first storage configured to store the set of normal data;
a second storage configured to store the set of abnormal data; and
a data processor configured to, in the case that the determiner determines the set of input data to be the set of abnormal data, correct the set of abnormal data stored in the second storage such that the set of abnormal data has the same structure as the set of normal data, thereby forming a set of corrected abnormal data, and to store the set of corrected abnormal data in the first storage;

wherein the determiner and the data processor are implemented via at least one central processing unit or at least one hardware processor wherein the determiner stores the set of normal data and the set of abnormal data in respective separate storage, and continues to receive the set of normal data while the set of abnormal data is stored in the second storage without stopping to store the set of input data due to the set of abnormal data, and wherein the data processor is configured to extract a specific data pattern from the set of normal data, to separate the set of abnormal data into a plurality of records based on a data field matching the specific data pattern among data fields of the set of abnormal data, and to correct the set of abnormal data in one or more records of the plurality of records, when the receiving of the set of normal data is completed.

2. The system of claim 1, wherein the determiner is configured to determine whether the set of input data is of the normal structure or the abnormal structure on a per-record basis for one or more records of the set of input data.

3. The system of claim 2, wherein the set of metadata comprises one or more of information related to the number of data fields for each record of the one or more records of the set of input data, information related to the number of separators for separating the data fields, and information related to a data pattern for each data field.

4. The system of claim 3, wherein the determiner is configured to determine whether a record of the one or more records of the set of input data is of the normal structure or the abnormal structure by:

comparing one of the number of data fields and the number of separators included in the set of metadata with one of the number of data fields and the number of separators included in the record of the one or more records of the set of input data, or determining whether a data pattern for each data field included in the record of the one or more records of the set of input data matches a data pattern for a corresponding data field included in the set of metadata.

5. The system of claim 1, wherein the data processor is configured to extract at least one specific data value for each data field from the set of normal data, and to correct data included in one or more determined data fields of a record of the plurality of records, the one or more determined data fields being any data fields not having the specific data value.

6. The system of claim 5, wherein the data processor is configured to delete a specific character string or character from the data included in the one or more determined data fields or to replace the specific character string or character with a predetermined character string or character.

7. The system of claim 1, wherein the data processor is configured to determine whether a record of the plurality of records is of the normal structure whenever the record is corrected, to store the record in a database of the data processor when the record is determined to be of the normal structure, and to store the set of corrected abnormal data in the first storage when all records are stored in the database.

8. The system of claim 1, wherein the data processor is configured to determine whether a record of the plurality of records is of normal structure whenever the record is corrected, and to again correct all records that have been corrected by the time of correction of the record when the record is not determined to be of the normal structure.

9. A method of processing data, the method comprising:

receiving, by a determiner, one or more sets of input data and a set of metadata about a structure of each of the sets of input data;

determining, by the determiner, whether a set of input data is of a normal structure or an abnormal structure based on the set of metadata, the set of input data accordingly being determined to be a set of normal data or a set of abnormal data, respectively;

storing, by the determiner, the set of normal data in a first storage;

storing, by the determiner, the set of abnormal data in a second storage;

in the case that the determiner determines the set of input data to be the set of abnormal data, correcting, by a data processor, the set of abnormal data stored in the second storage such that the set of abnormal data has the same structure as the set of normal data, thereby creating a set of corrected abnormal data; and storing, by the data processor, the set of corrected abnormal data in the first storage, wherein the set of normal data and the set of abnormal data is stored in respective separate storage, and the receiving includes continuing to receive the set of normal data while the set of abnormal data is stored in the second storage without stopping to store the set of input data due to the set of abnormal data, wherein the correcting of the set of abnormal data comprises:

extracting a specific data pattern from the set of normal data;

separating the set of abnormal data into a plurality of records based on a data field matching the specific data pattern among data fields of the set of abnormal data; and correcting the set of abnormal data in one or more records of the plurality of records, and wherein the correcting of the set of abnormal data is performed when the receiving of the set of normal data is completed.

10. The method of claim 9, wherein the determining of whether the set of input data is of the normal structure or the abnormal structure comprises determining whether the input data is of the normal structure or the abnormal structure on a per-record basis for one or more records of the set of input data.

11. The method of claim 10, wherein the set of metadata comprises one or more of information about the number of data fields for each record of the one or more records of the set of input data, information about the number of separators for separating the data fields, and information about a data pattern for each data field.

12. The method of claim 11, wherein the determining of whether the input data is of the normal structure or the abnormal structure comprises determining whether a record of the one or more records of the set of input data is of the normal structure or the abnormal structure by:

comparing one of the number of data fields and the number of separators included in the set of metadata with one of the number of data fields and the number of separators included in the record of the one or more records of the set of input data, or determining whether a data pattern for each data field included in the record of the one or more records of the set of input data matches a data pattern for a corresponding data field included in the set of metadata.

13. The method of claim 9, wherein the correcting of the set of abnormal data in one or more records of the plurality of records comprises:
    extracting at least one specific data value for each data field from the set of normal data; and
    correcting data included in one or more determined data fields of a record of the plurality of records, the one or more determined data fields being any data fields not having the specific data value.

14. The method of claim 13, wherein the correcting of data included in the one or more determined data fields comprises deleting a specific character string or character from the data included in the one or more determined data fields or replacing the specific character string or character with a predetermined character string or character.

15. The method of claim 9, wherein the correcting of the set of abnormal data in the one or more records of the plurality of records comprises:
    determining whether a record of the plurality of records is of the normal structure whenever the record is corrected;
    storing the record in a database of the data processor when the record is determined to be of the normal structure; and
    storing the set of corrected abnormal data in the first storage when all records are stored in the database.

16. The method of claim 9, wherein the correcting of the set of abnormal data in the one or more records of the plurality of records comprises:
    determining whether a record of the plurality of records is of the normal structure whenever the record is corrected; and
    again correcting all records that have been corrected by the time of correction of the record when the record is not determined to be of the normal structure.

* * * * *